(No Model.)
D. A. WILKINSON.
COMBINED BIN AND SIFTER.
No. 458,670. Patented Sept. 1, 1891.
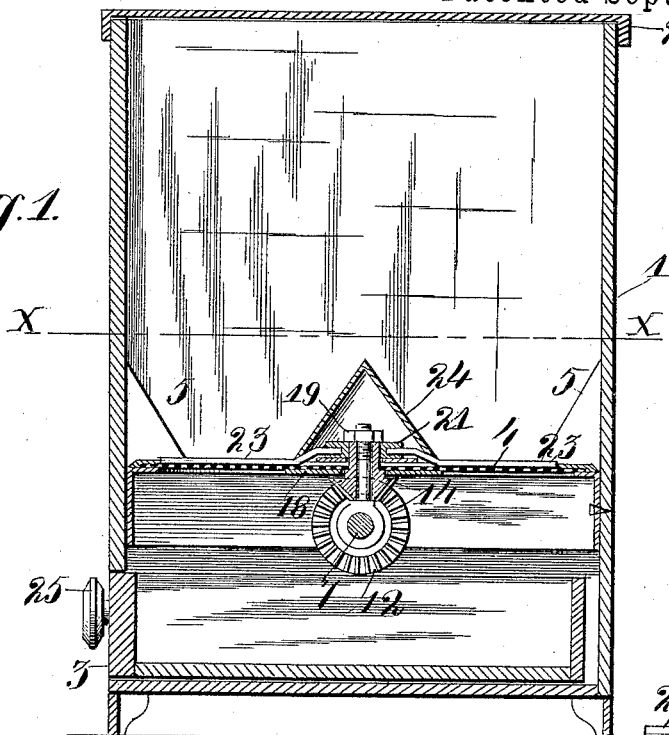
Fig. 1.
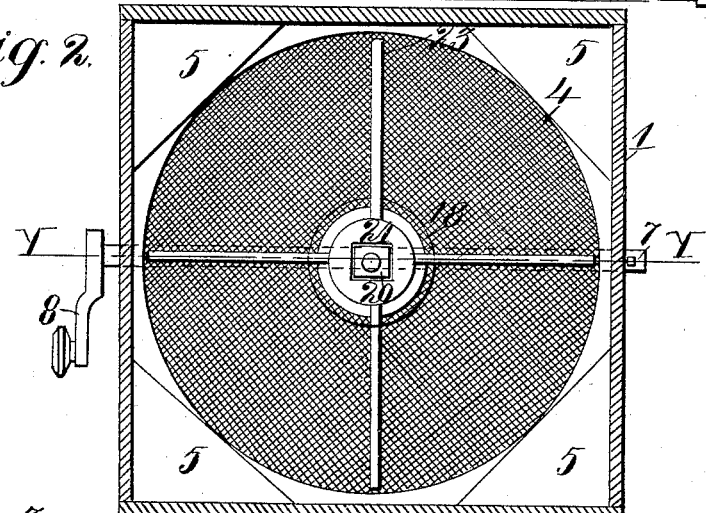
Fig. 2.
Fig. 4.
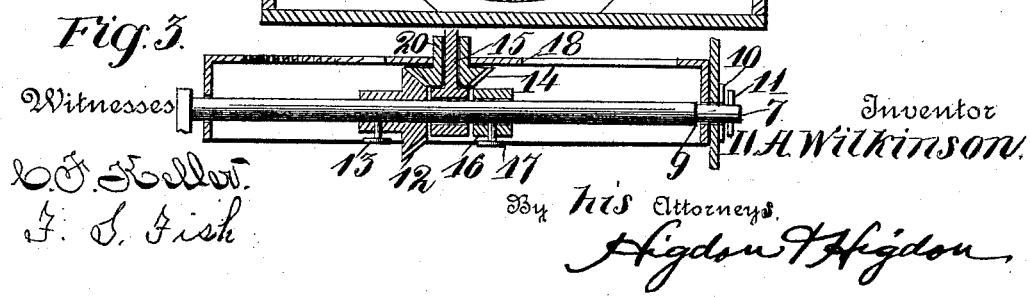
Fig. 3.
Witnesses
C. F. Keller
F. S. Fish
Inventor
D. A. Wilkinson
By his Attorneys
Higdon & Higdon

UNITED STATES PATENT OFFICE.

DAVID A. WILKINSON, OF ST. LOUIS, MISSOURI.

COMBINED BIN AND SIFTER.

SPECIFICATION forming part of Letters Patent No. 458,670, dated September 1, 1891.

Application filed January 26, 1891. Serial No. 379,105. (No model.)

*To all whom it may concern:*

Be it known that I, DAVID A. WILKINSON, of the city of St. Louis and State of Missouri, have invented certain new and useful Improvements in a Combined Bin and Sifter, of which the following is a full, clear, and exact description, reference being had to the accompanying drawings, forming a part hereof.

My invention relates to improvements in a combined bin and sifter; and it consists in the novel arrangement and combination of parts, as will be more fully hereinafter described, and designated in the claims.

In the drawings, Figure 1 is a vertical longitudinal section of my complete invention. Fig. 2 is a horizontal cross-section taken on the line $x\ x$ of Fig. 1. Fig. 3 is a vertical section taken on the line $y\ y$ of Fig. 2; and Fig. 4 is a detailed view of the mechanism by which the vertical gearing is connected to the horizontal gearing.

Referring to the drawings, 1 indicates a bin, which may be constructed of any desired dimensions and of any desired material. Said receptacle is provided with a lid or cover 2 of the ordinary and usual construction. Suitably secured in the bottom of said receptacle is a drawer 3, in which the sifted product is received. Situated at a suitable and convenient distance above said drawer is a wire-gauze diaphragm 4, constructed of fine or coarse mesh suitably adapted for the sifting of flour or meal. Said wire-gauze 4 is preferably square, corresponding in size and dimensions to the interior peripheral surface of bin 1. Said gauze is suitably and mechanically secured in said bin. Situated in the corners of said bin are sheds 5, which prevent the flour or meal from accumulating in the corners of the bin and not coming in contact with the functional mechanism by which the sifting is effected. Said sheds are of the form of an isosceles triangle, and the equilateral sides thereof fit against the sides of the bin of the corners in which they are placed, respectively, and the bases thereof fit snugly against the wire-gauze sieve 4, the same being suitably and mechanically secured in their normal position in the bin.

7 indicates a horizontal shaft, by the aid of which power, and consequently motion, is imparted to the agitating mechanism of the sifter. Said shaft is situated at a suitable and convenient distance below the wire-gauze sieve 4, and is mounted in suitable bearings in the bin.

8 indicates a crank or handle by which said shaft 7 is revolved. Said shaft 7 is provided on the end opposite to that to which crank 8 is secured with a shoulder 9, thereby assisting to prevent said shaft from working out of its bearings.

10 indicates a washer, which is adapted to fit over the decreased portion of said shaft, and 11 a pin which passes through the same, the functions of which washer and pin are readily perceived. Adjustably mounted on said shaft is a bevel gear-wheel 12, the same being held in its desired adjustment on said shaft by means of a thumb-screw 13. Said wheel 12 is adapted to mesh with a bevel-pinion 14, which pinion is mounted on a stud 15, which stud is adjustably mounted on shaft 7 and is held in its proper adjustment on said shaft by being interposed between adjustable bevel-wheel 12 and also an adjustable collar 16, the desired adjustment of the latter being effected by means of a thumb-screw 17. Said stud 15 has its bearing in pinion 14, the stem of which pinion has its bearing in plate 18, which plate is rigidly secured to wire-gauze sieve 4 on its lower surface and is held in its bearing by means of a nut 19, which nut is adapted to be screwed on the upper end of stud 15. Pinion 14 is revolubly mounted on stud 15, the stem 20 of which pinion is provided with an angular portion, which portion extends or protrudes above the upper surface of sieve 4.

21 indicates a disk provided with an angular aperture adapted to fit on stem 20, and is also additionally provided with screw-threaded bores 22, in which radial arms 23 are adapted to be screwed. Said radial arms are of sufficient length to pass and rub over the entire surface of wire-gauze 4, exclusive of the shed corners, and have the function of pulverizing the lumps of the product to be sifted.

24 indicates a conical cap, which is placed over the gearing mechanism to prevent the flour or meal from entering the same. Said conical cap is rigidly secured to the radial arms 23 and moves with them. Said conical cap is so secured to the radial arms that its lower circumferential surface is in almost direct contact with the upper surface of sieve 4.

25 indicates a button by which drawer 3 is manipulated.

In place of using bevel gear-wheels, ordinary bevel friction-wheels may be employed, in which case the mechanical construction and functional operation are the same.

Having fully described my invention, what I claim is—

1. A combined bin and sifter consisting of a receptacle, a sieve located therein, a horizontal arm or arms adapted to rub on the upper surface of said sieve for effecting the sifting, a horizontal shaft located below said sieve, a bevel-wheel and collar adjustably mounted on the same, a stud mounted on said horizontal shaft in an interposed position between said bevel-wheel and collar, a pinion-wheel mounted on said stud and adapted to mesh with said bevel-wheel, and a crank for revolving said horizontal shaft, substantially as set forth.

2. A combined bin and sifter consisting of a receptacle, a sieve located therein, horizontal arms adapted to rub on the upper surface of said sieve for effecting the sifting, a horizontal shaft located below said sieve, a bevel-wheel and collar adjustably mounted on the same, a stud mounted on said horizontal shaft in an interposed position between said bevel-wheel and collar, a pinion provided with an angular stem mounted on said stud, a disk provided with a corresponding angular aperture and screw-threaded bores in which said horizontal arms are secured, mounted on said stem, and a crank for revolving said horizontal shaft, substantially as set forth.

3. A combined bin and sifter consisting of a receptacle, a sieve located in the same, a drawer located below said sieve adapted to receive the filtered product, horizontal arms adapted to rub on the upper surface of said sieve for effecting the sifting, a horizontal shaft located below the same, bevel-wheel and collar adjustably mounted on the same, a stud mounted on said horizontal arm in an interposed position between said bevel-wheel and collar, a pinion-wheel provided with an angular stem mounted on said stud, a disk provided with a corresponding angular aperture and screw-threaded bores in which said horizontal arms are secured, mounted on said stem, and a crank for revolving said horizontal shaft, substantially as set forth.

4. The combination of a receptacle with a sieve and drawer located in the same, sheds located in the corners of said receptacle and resting on said sieve, horizontal arms adapted to rub on the upper surface of said sieve for effecting the sifting, a conical cap mounted on said arms and moving therewith, a horizontal shaft located below said sieve, a bevel-wheel and collar adjustably mounted on the same, a stud provided with screw-threads mounted on said horizontal shaft in an interposed position between said bevel-wheel and collar, a nut adapted to be screwed on said stud, a pinion-wheel provided with an angular stem mounted on said stud, a disk provided with a corresponding angular aperture and screw-threaded bores in which said arms are secured, mounted on said angular stem, and a crank for revolving said horizontal shaft, substantially as set forth.

In testimony whereof I affix my signature in presence of two witnesses.

DAVID A. WILKINSON.

Witnesses:
 EDWARD E. LONGAN,
 C. F. KELLER.